(12) United States Patent
Kane et al.

(10) Patent No.: US 6,851,179 B2
(45) Date of Patent: Feb. 8, 2005

(54) MAGNETIC HEAD PRODUCING METHOD

(75) Inventors: Junichi Kane, Kawasaki (JP); Hitoshi Kanai, Kawasaki (JP); Kenji Noma, Kawasaki (JP); Naoki Mukoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 09/740,602

(22) Filed: Dec. 19, 2000

(65) Prior Publication Data

US 2001/0052181 A1 Dec. 20, 2001

(30) Foreign Application Priority Data

Jun. 19, 2000 (JP) ........................................ 2000-183042

(51) Int. Cl.$^7$ ............................................. G11B 5/127
(52) U.S. Cl. .................................................. 29/603.23
(58) Field of Search ........................ 29/603.23, 603.07, 29/603.08, 603.09, 603.12, 603.01, 603.13, 603.14; 428/692, 694 R, 694 T, 694 TP, 694 TS, 694 ST, 694 SG, 694 TR, 694 TB, 694 TM, 900; 427/127, 128, 130, 131

(56) References Cited

U.S. PATENT DOCUMENTS

| | | | | |
|---|---|---|---|---|
| 6,143,388 A | * | 11/2000 | Bian et al. | ................ 428/694 T |
| 6,146,776 A | * | 11/2000 | Fukuzawa et al. | .......... 428/692 |
| 6,147,843 A | * | 11/2000 | Yamamoto et al. | |
| 6,157,526 A | * | 12/2000 | Watanabe et al. | |

FOREIGN PATENT DOCUMENTS

| JP | 11096516 | 4/1999 |
|---|---|---|
| JP | 11-175923 | 7/1999 |

* cited by examiner

Primary Examiner—Ljiljana Ciric
(74) Attorney, Agent, or Firm—Greer, Burns & Crain, Ltd.

(57) ABSTRACT

The present invention provides a method for producing a magnetic head whose reproduction waveform has small distortions, and forming a hard magnetism layer for applying a bias magnetic field to a magnetoresistive element, which is a multilayer film including a fixed magnetic layer having magnetization fixed to a first direction and a free magnetic layer having an easy axis of magnetization that is directed to a second direction, is formed in an area including at least one of a front area in the first direction and a rear area in the first direction.

5 Claims, 8 Drawing Sheets

MAGNETIC HEAD PRODUCING METHOD

BACKGROUND OF THE INVENTION

1. Field of the Invention

The present invention relates to a method for producing a magnetic head for detecting intensity of an external magnetic field by detecting the value of resistance of a magnetoresistive element, wherein the resistance changes dependently on the intensity of the external magnetic field.

2. Description of the Related Art

In recent years, a great deal of information has been routinely handled as the use of computers spreads. In order to record or reproduce such a great deal of information, hard disk drives (HDDs) are used, which are characterized by having a large memory capacity and a high speed for accessing information. In general, HDDs have a magnetic disk whose surface is composed of a magnetic material, and a composite type magnetic head wherein a recording head for recording information on the magnetic disk and a reproducing head for reproducing the information recorded on the magnetic disk. The recording head has a minute coil, and is arranged close to the magnetic disk. Respective microscopic areas (1-bit areas) in the surface of the magnetic disk are magnetized by a magnetic field generated from the coil of the recording head, so that information is recorded on the magnetic disk. The reproducing head outputs an electrical reproducing signal corresponding to the magnetic field generated by magnetization from each of the 1-bit areas. The information recorded on the magnetic disk is reproduced through the reproducing head.

At present, in many reproducing heads mounted on HDDs, a magnetoresistive head (MR head) is used, wherein magnetoresistance effect that resistance changes dependently on an external magnetic field is used. With improvement of recording density of magnetic disks, spin valve magnetoresistive heads (referred to as "SVMR heads" hereinafter) are being earnestly made practicable. The SVMR heads have particularly high sensitivity among MR heads, that is, generate change in output dependently on change in an external magnetic field.

The SVMR head has a spin valve element composed of a multilayer film comprising a free magnetic layer wherein the direction of magnetization changes dependently on an external magnetic field, a nonmagnetic metal layer, a fixed magnetic layer wherein the direction of magnetization is fixed, an antiferromagnetic layer which generates an exchange coupling magnetic field for fixing the magnetization direction of the fixed magnetic layer; and a shield layer for shielding this spin valve element magnetically. The spin valve element generates change in its resistance dependently on relative change in the angle between the direction of magnetization in the fixed magnetic layer and the direction of magnetization in the free magnetic layer. High sensitivity of the SVMR head originates from the fact that this resistance change is great.

In the spin valve element, hard magnetism layers are arranged, which apply a bias magnetic field to the free magnetic layer so that the free magnetic layer is divided by single-domains. Electrode terminals are also arranged, which send sense current $I_s$ to the spin valve element when the SVMR head is operated. When this SVMR head is made close to the magnetic disk and the two are relatively moved in the state that the sense current $I_s$ is sent, the value of the electrical resistance of the spin valve element successively changes dependently on signal magnetic field $H_{sig}$ from the magnetic disk. An output voltage having a value represented by the product of the value of the electrical resistance and the sense current $I_s$ is outputted. A waveform representing change in the output voltage with the passage of time is referred to as a "reproduction waveform" hereinafter.

The spin valve element is preferably a spin valve element whose electrical resistance linearly changes dependently on the change in the signal magnetic field $H_{sig}$ from the magnetic disk. In order to realize such linear change, the angle between the directions of magnetization in the fixed magnetic layer and the free magnetic layer is ideally 90° in the state that the signal magnetic field $H_{sig}$ is not present. This angle is adjusted, for example, by subjecting the spin valve element of the SVMR head, when being made, to a pin annealing treatment in which the spin valve element is heated while a magnetic field is applied in a given direction for fixing magnetization of the fixed magnetic layer; and then conducting a free return treatment in which application of a magnetic field and heating are simultaneously performed so that the directions of easy axes of magnetization in the free magnetic layer and the shield layer are made perpendicular to the fixed magnetization direction in the fixed magnetic layer.

Production of a magnetic head requires various heat treatments, such as heat treatment for hardening a resist which surrounds the coil in the recording head. Even if these heat treatments are conducted in the state that no external magnetic field is applied, for example, the fixed magnetic layer receives the antimagnetic field of the fixed magnetic layer itself so that the magnetization of the fixed magnetic layer is inclined. As a result, the above-mentioned angle is off from the above-mentioned perpendicularity. By this angle gap, the following trouble arises: in the SVMR head, its output voltage does not respond linearly to the input of the signal magnetic field $H_{sig}$, so that the reproduction waveform is distorted.

SUMMARY OF THE INVENTION

In light of the above-mentioned situations, an object of the present invention is to provide a method for producing a magnetic head whose reproduction waveform has small distortions.

The magnetic head producing method of the present invention for attaining the above-mentioned object is a magnetic head producing method for producing a magnetic head comprising a magnetoresistive element which is a multilayer film comprising a fixed magnetic layer having magnetization fixed to a first direction and a free magnetic layer having an easy axis of magnetization that is directed to a second direction and having magnetization whose direction changes dependently on an external magnetic field, and which exhibits the value of resistance dependently on the angel between the direction of the magnetization of the fixed magnetic layer and the direction of the magnetization of the free magnetic layer, the magnetic head being for detecting intensity of the external magnetic field by detecting the value of the resistance of the magnetoresistive element, comprising a hard magnetism layer forming step of forming a hard magnetism layer for applying a bias magnetic field to the magnetoresistive element in an area including at least one of a front area in the first direction and a rear area in the first direction seeing from a viewpoint on the magnetoresistive element.

Preferably, the above-mentioned magnetic head producing method further comprises a first magnetization fixing step of fixing the direction of the magnetization of the hard magnetism layer formed in the hard magnetism layer forming step to the first direction.

As described in the column of Description of Related Art, for example, at the time of heating and hardening a resist used in a magnetic head in the process for producing the magnetic head, the temperature of its magnetoresistive element frequently rises up. By this rise in the temperature, the direction of magnetization of the free magnetic layer trends to be inclined.

In the magnetic head producing method according to the present invention, the hard magnetism layer is formed at the area including at least one of the front and the rear in the first direction. Therefore, if the direction of the magnetization of the hard magnetism layer is fixed to, for example, the first direction, the bias magnetic field directed to the first direction is applied to the magnetization of the fixed magnetic layer from the hard magnetism layer. Even when the temperature of the magnetoresistive element rises, the direction of the magnetization of the fixed magnetic layer is stabilized by the bias magnetic field and is not easily inclined. If the direction of the magnetization of the fixed magnetic layer is not easily inclined, the perpendicularity between the direction of the magnetization of the fixed magnetic layer and the directions of the easy axes of the magnetization of the free magnetic layer, a shield layer and the like is easily kept. For this reason, the magnetic head produced by the magnetic head producing method according to the present invention is a magnetic head wherein a reproduction waveform having small distortions is generated. In order to make the direction of the magnetization of the fixed magnetic layer more stables, it is preferred to form the hard magnetism layer in the area including both the front and the rear in the first direction.

Preferably, the magnetic head producing method having the first magnetization fixing step further comprises:

a temperature raising step of raising the temperature of the magnetoresistive element, a second magnetization fixing step of converting and fixing the direction of the magnetization of the hard magnetism layer fixed in the first magnetization fixing step to the second direction, and wherein after the hard magnetism layer forming step and the first magnetization fixing step, the temperature raising step is performed, and thereafter the second magnetization fixing step is performed.

The magnetic head producing method having the second magnetization fixing step may comprise, in the case that the magnetic head has a recording coil and has a function of generating a magnetic field from the recording coil as well as detecting the intensity of the external magnetic field, a coil forming step of forming the recording coil while surrounding the recording coil with an organic insulator, wherein the temperature raising step is a step of heating and hardening the organic insulator with which the recording coil formed in the coil forming step is surrounded.

By performing the second magnetization fixing step, the hard magnetism layer has a magnetization direction suitable for a hard magnetism layer constituting a finally produced magnetic head.

Preferably, in the magnetic head producing method having the second magnetization fixing step, the magnetoresistive element is arranged so that this element is close to or brought into contact with a magnetic recording medium, on which information is recorded dependently on the direction of magnetization at the time of operation, at either side of the front or the rear in the first direction; the hard magnetism layer formed in the hard magnetism layer forming step has a portion positioned at the side facing the magnetic recording medium, as seen from the magnetoresistive element; and this portion is removed after the second magnetization fixing step.

The function, which makes the magnetization of the fixed magnetic layer stable, of the portion facing the magnetic recording medium as seen from the magnetoresistive element, in the hard magnetism layer is ended in the temperature raising step. Thus, this portion can be removed after the temperature raising step.

Figure 7A:
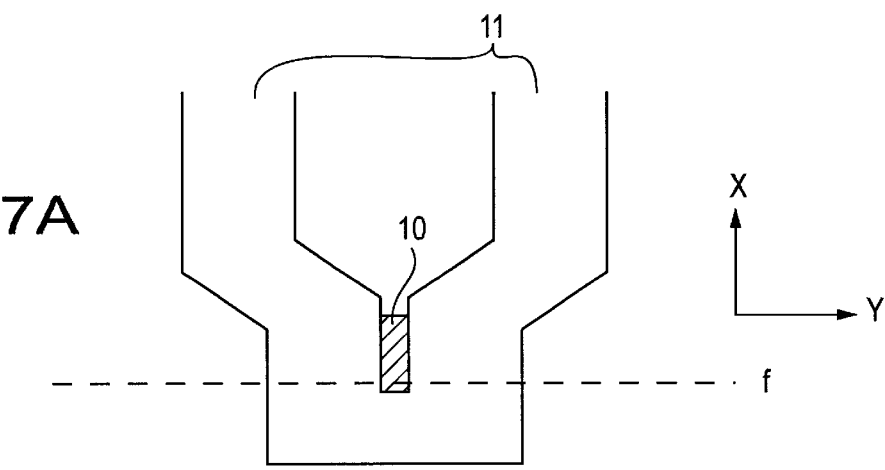

Each of FIGS. 7(A), (B) and (C) is a view illustrating an example of the shape of a hard magnetism layer formed by the magnetic head producing method according to the embodiment.

Figure 8:
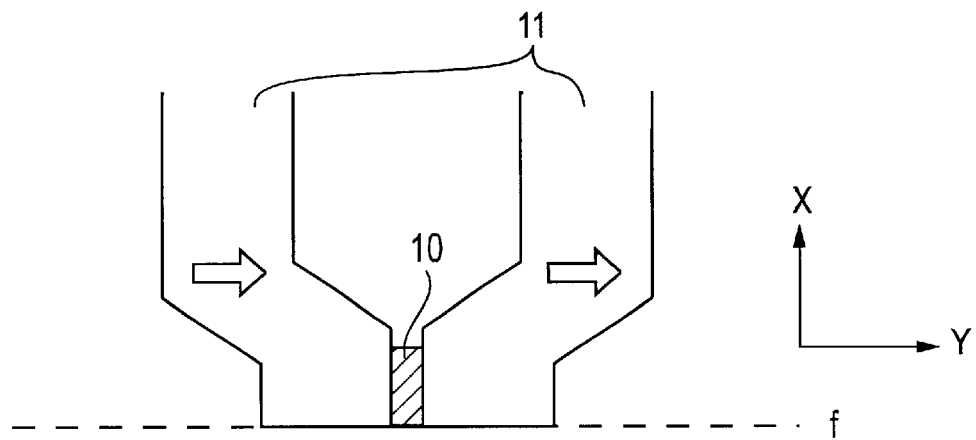

FIG. 8 is a view illustrating a first example of the state of the magnetization of the hard magnetism layer, before being subjected to heating treatment, formed by a magnetic head producing method in the prior art.

Figure 9:
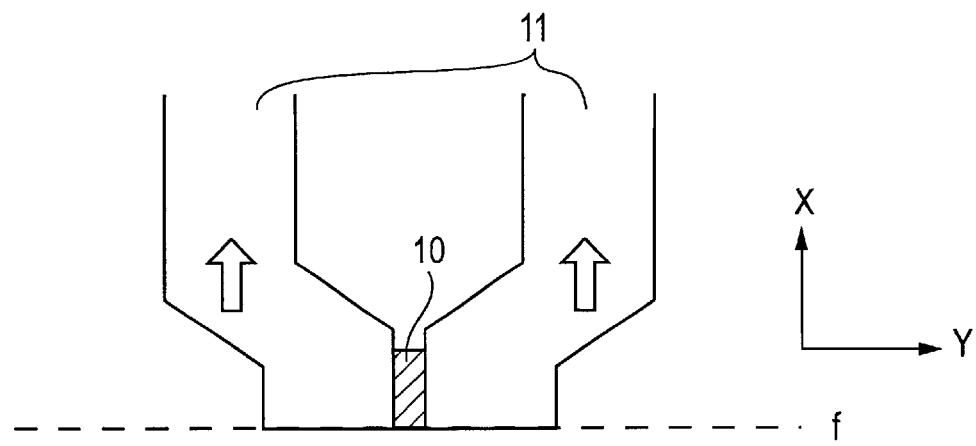

FIG. 9 is a view illustrating a second example of the state of the magnetization of the hard magnetism layer, before being subjected to heating treatment, formed by the magnetic head producing method in the prior art.

Each of FIGS. 10(*a*), 10(B) and 10(C) is a view illustrating an example of the state of the magnetization of the hard magnetism layer, before being subjected to heating treatment, formed by the magnetic head producing method according to the present embodiment.

DETAILED DESCRIPTION OF THE PREFERRED EMBODIMENT

Hereinafter, the embodiment of the present invention will be described.

The present invention relates to a method for producing a magnetic head, but after description on a magnetic head produced by an embodiment of the magnetic head producing method of the present invention, the embodiment of the magnetic head producing method of the present invention will be described.

[Magnetic Head]

Figure 1:
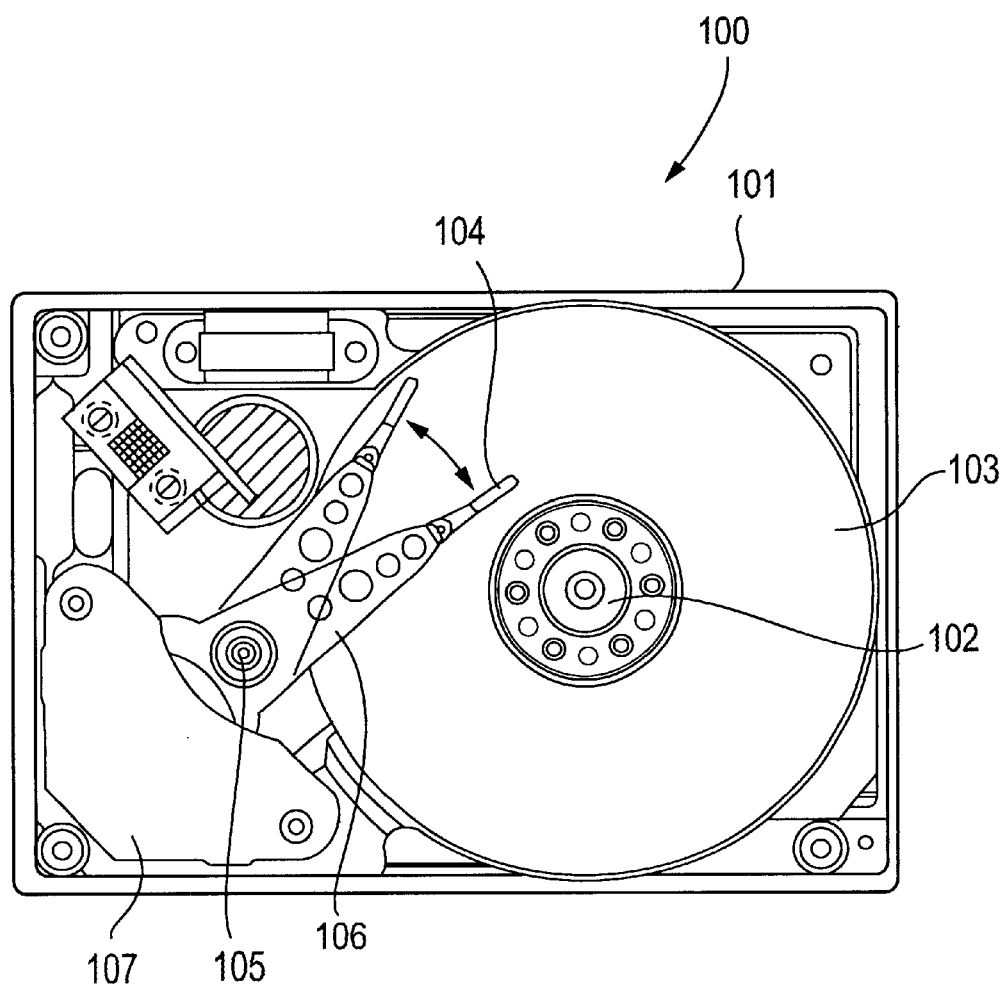
FIG. 1 is a view of the outline of an HDD.

FIG. 1 is a view of the outline of the HDD.

As shown in FIG. 1, a housing 101 of the HDD (HDD 100) has therein a rotary axis 102, a magnetic disk 103 fitted to the rotary axis 102, a floating head slider 104 which is close to a surface of the magnetic disk 103 and opposite thereto, an arm axis 105, a carriage arm 106 having at its tip the fixed floating head slider 104 and moving horizontally over the magnetic disk 103 and around the arm axis 105, and an actuator 107 for driving the horizontal movement of the carriage arm 106.

In this HDD 100, information is recorded on the magnetic disk 103 and the information recorded on the magnetic disk 103 is reproduced. At the time of recording and reproducing the information, the carriage 106 is first driven by the actuator 107 made of a magnetic circuit and then the floating head slider 104 is positioned on a desired track on the rotating magnetic disk 103. At the tip of the floating head slider 104, a magnetic head which is not illustrated in FIG. 1 and is produced by the magnetic head producing method according to the present embodiment is set up. This magnetic head successively accesses each of 1-bit areas lining up in each of the tracks on the magnetic disk 103 as the magnetic disk 103 rotates. The magnetic head may be a head which contacts the magnetic disk 103. In the present embodiment, the magnetic head is a composite type magnetic head made of a recording head and a reproducing head. When an electrical signal is inputted to the recording head, the recording head applies a magnetic field to each of the 1-bit areas, dependently on the inputted recording signal, so as to record information carried on the recording signal, as a direction of magnetization, on each of the 1-bit areas. The reproducing head takes out the information recorded as the direction of magnetization in each of the 1-bit areas by producing an electrical reproducing signal dependently on the magnetic field generated from the magnetization. The inner space of the housing 101 is sealed off by a non-illustrated cover.

Second, the magnetic head produced by the magnetic head producing method according to the present embodiment will be specifically described.

Figure 2:
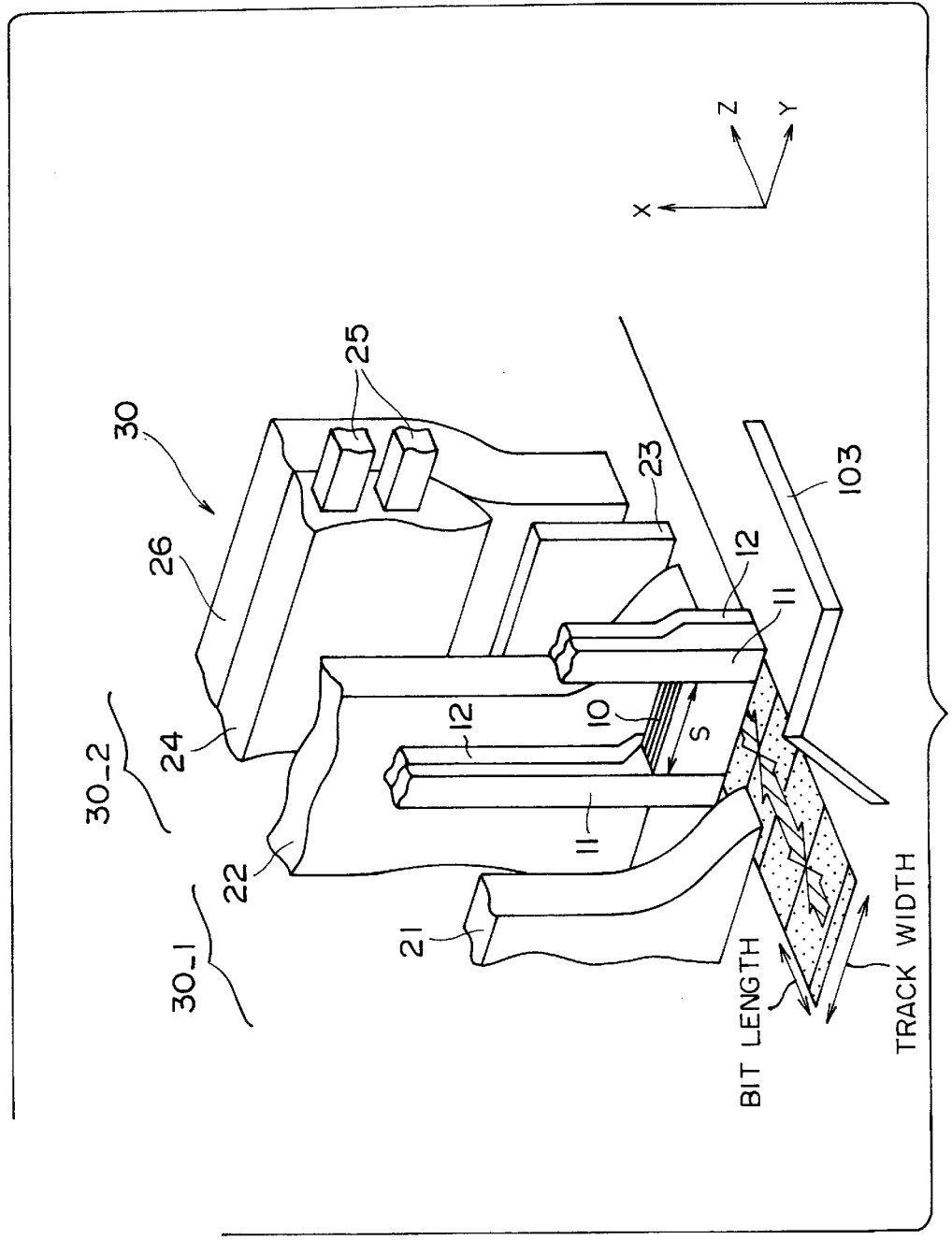
FIG. 2 is a view illustrating the structure of a magnetic head set up in the HDD.

FIG. 2 is a view illustrating the structure of a magnetic head set up in the HDD.

FIG. 2 is a view showing the structure of the magnetic head (magnetic head 30), which is set up in the HDD 100 and is positioned close to the magnetic disk 103. As shown in FIG. 2, the magnetic head 30 is a composite type magnetic head composed of a reproducing head 30_1 and a recording head 30_2, and has a piggyback structure wherein the recording head 30_2 is added to the back of the reproducing head 30_1.

The recording head 30_2 is composed of a recording coil 25 for generating a magnetic field; an organic insulating layer 24 which surrounds the recording coil 25 to prevent leakage of any current passing through the recording coil 25 and fixes the recording coil 25; two magnetic poles which are composed of a lower recording magnetic pole (lower core) 22 and an upper recording magnetic pole 26 and sandwich the recording coil 25 and the organic insulating layer 24 in the thickness direction of the layer 24; and a recording gap layer 23 which is sandwiched between the tip of the lower recording magnetic pole 22 and the tip of the upper recording magnetic pole 26 in the thickness direction of the layer 23. The tip of the lower recording magnetic pole 22 faces the magnetic disk 103, and the magnetic field generated from the recording coil 25 is conducted to the tip, which the magnetic disk 103 faces, of the upper recording magnetic pole 26 so that the magnetic field is leaked out to the magnetic disk 103. The recording head 30_2 reverses the magnetization in each of the 1-bit areas in the magnetic disk by the magnetic field leaked out from the above-mentioned tip, so that information is recorded on the magnetic disk 103.

In FIG. 2, each of x direction, y direction and z direction, any two of which are perpendicular to each other, is represented by one of three arrows. The above-mentioned thickness direction of the layer 24 and that of the layer 23 correspond to the z direction. That is, the respective elements constituting the recording head 30_2 are piled up in the z direction. When the magnetic head 30 is positioned over the magnetic disk 103 and close thereto, the z direction is equal to the length direction of bits in the magnetic disk 103, that is, the direction along which the tracks extend, and the x direction is equal to the direction perpendicular to the face of the magnetic disk 103. The y direction is equal to the direction of the width of the tracks of the magnetic disk 103. Hereinafter, the structure of the magnetic head 30 and so on will be described, using the x direction, the y direction and the z direction. In the same way as in FIG. 2, each of these directions is represented by one arrow in FIGS. 3, 4 and 6–10. The reverse directions of the x, y and z directions are represented by −x direction, −y direction and −z direction, respectively.

The reproducing head 30_1 is composed of a spin valve element 10, which corresponds to the magnetoresistive element referred to in the present invention; a pair of hard magnetism layers 11 separated from each other in the y direction; a pair of electrode terminals 12 separated from each other in the y direction; non-illustrated lower and upper reproduction gap layers, which are arranged to sandwich the spin valve element 10, the hard magnetism layers 11 and the electrode terminals 12 in the z direction are made of an insulating material; lower and upper reproduction shields 21 and 22, which are arranged to sandwich these gap layers in the z direction. In this case, the lower reproduction shield 22 is also used as the above-mentioned lower reproducing magnetic pole 22. In this reproducing head 30_1, the area between the pair of electrodes 12 is a signal detecting area S where any signal magnetic field from the magnetic disk 103 is detected.

Figure 3:
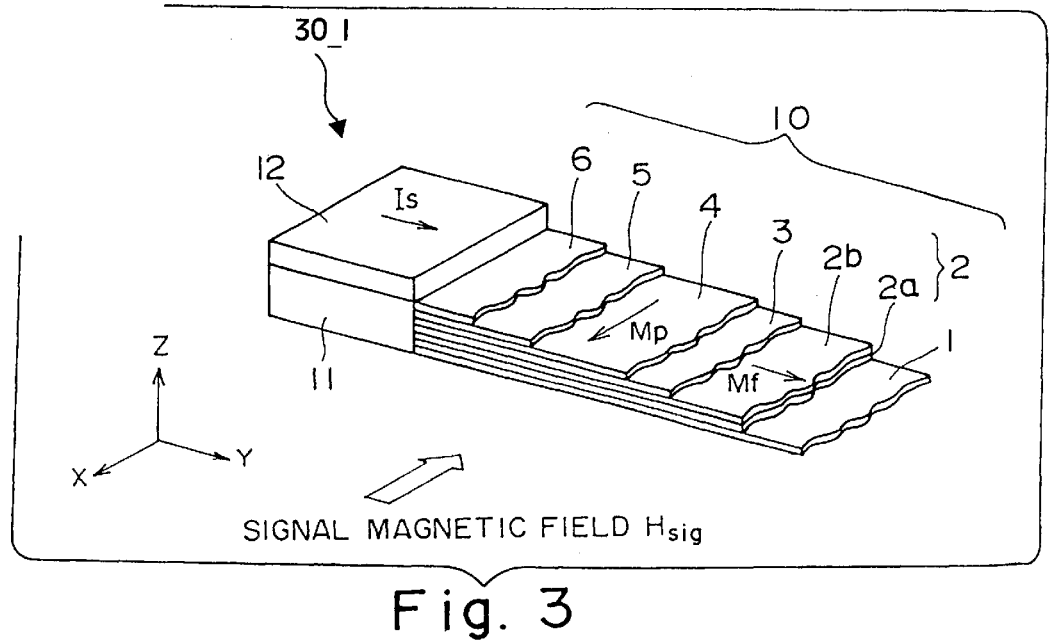
FIG. 3 is a perspective view illustrating a main portion of a reproducing head produced by the magnetic head producing method according to an embodiment.
Figure 4:
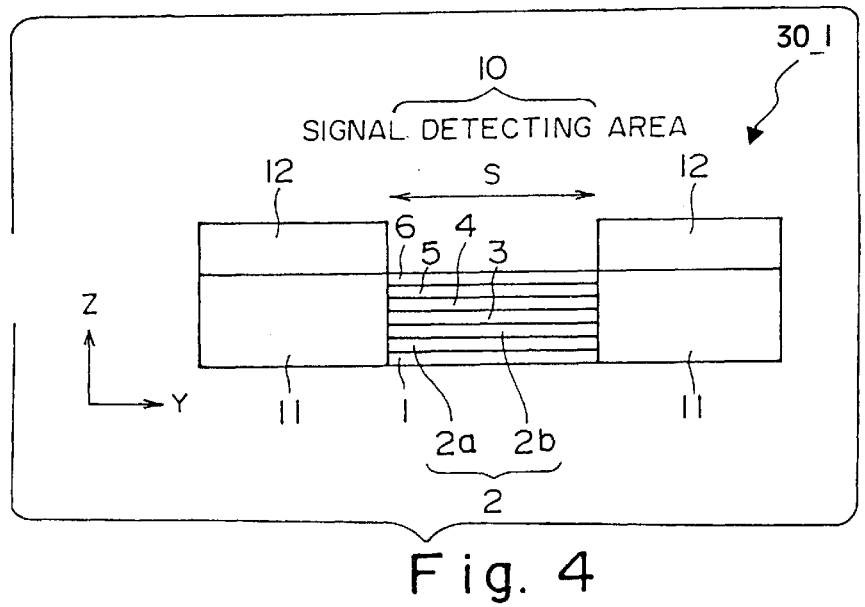
FIG. 4 is a sectional side view of the main portion of the reproducing head illustrated in FIG. 3.

Referring to FIGS. 3 and 4, the structure of the reproducing head 30_1 will be specifically described.

FIG. 3 is a perspective view showing a main portion of the reproducing head produced by the magnetic head producing method of the present embodiment, and FIG. 4 is a sectional side view of the main portion of the reproducing head shown in FIG. 3.

In FIGS. 3 and 4, the spin valve element 10, the hard magnetism layers 11, and the electrode terminals 12, which constitute the reproducing head 30_1 of the magnetic head 30, are shown.

The spin valve element 10 is composed of an undercoat layer 1 made on the lower reproduction gap layer on the lower reproduction shield 21; a free magnetic layer 2 made of a soft magnetism material and made on the undercoat layer 1, wherein the direction of magnetization rotates dependently on the magnetic field from the outside; a nonmagnetic metal layer 3 made on the free magnetic layer 2; a fixed magnetic layer 4 made on the nonmagnetic metal layer 3 and magnetized to a given fixed direction; an antiferromagnetic layer 5 made on the fixed magnetic layer 4 and subjected to exchange coupling to the fixed magnetic layer 4 so as to fix the magnetization direction of the fixed magnetic layer 4; and a gap layer 6 made on the antiferromagnetic layer 5. The free magnetic layer 2 has a bilayer structure and is composed of the first free magnetic layer 2a at the side of the undercoat layer 1 and the second free magnetic layer 2b at the side of the nonmagnetic metal layer 3.

The pair of hard magnetism layers 11 are made to contact the end in the y direction of the spin valve element 10 and the end in the −y direction thereof. These hard magnetism layers 11 are usually used to apply a magnetic field along the y direction or along the −y direction to the free magnetic layer 2 to fix the magnetic wall of the free magnetic layer 2, whereby generation of Barkhausen noises, which are easily generated in reproducing signals in the head, are suppressed. As will be described later, however, these hard magnetism layers 11 are also used in the present invention to apply a magnetic field along the x direction or along the −x direction to the fixed magnetic layer 4 when the head 30 is produced, so as to stabilize the magnetization of the fixed magnetic layer 4 in the x direction or the −x direction. A case in which the magnetization of the fixed magnetic layer 4 is along the x direction will be described hereinafter. The spin valve element 10 has the pair of electrode terminals 12 made on the respective hard magnetism layers 11. Sense current $I_s$ is applied to the spin valve element 10 from these electrode terminals 12.

The following will describe the above-mentioned respective layers constituting the spin valve element 10.

The undercoat layer 1 is made of, for example, a tantalum (Ta) film having a thickness of 50 angstrom (Å).

The first free magnetic layer 2a is made of, for example, a nickel-iron (NiFe) film having a thickness of about 40 Å. The second free magnetic layer 2b is made of, for example, cobalt-iron-boron (CoFeB) film having a thickness of about 25 Å. The two layers are combined to make the free magnetic layer 2.

The nonmagnetic metal layer 3 is made of, for example, a copper (Cu) film having a thickness of 30 Å.

One of reasons why the free magnetic layer 2 has a bilayer structure as described above is as follows. If the free magnetic layer 2 is composed of only the first free magnetic layer 2a made of a NiFe film, it becomes easy that Ni and Cu diffuse mutually between the first free magnetic layer 2a and the nonmagnetic metal layer 3. Thus, such mutual diffusion is prevented by putting the second free magnetic layer 2b made of a CoFeB film, which does not solid-dissolve in Cu, between the above-mentioned two layers. Another reason is as follows. Since a CoFeB film has a relatively large coercive force $H_c$, the film is not the best film for attaining the function that the direction of magnetization changes dependently on an external magnetic field. Thus, the first free magnetic layer 2a made of a NiFe film having a small coercive force $H_c$ is deposited on the second free magnetic layer 2b made of a CoFeB film in such a manner that the layer 2a becomes somewhat thick, so that the free magnetic layer 2 is made up to a bilayer structure. In this way, rotation of magnetization is made easy in the whole of the free magnetic layer 2.

The fixed magnetic layer 4 is made of, for example, a CoFeB film having a thickness of 22 Å.

In order to generate a large exchange coupling magnetic field, the antiferromagnetic layer 5 is preferably made of a material having a high blocking temperature, at which any exchange coupling magnetic field is lost, and having high corrosion resistance. The antiferromagnetic layer 5 is made of an ordered alloy film having a thickness of, for example, 100 Å or more and typically 150 Å. Examples of the ordered alloy film include a palladium-platinum-manganese (PdPtMn) film, a platinum-manganese (PtMn) film, a palladium-manganese (PdMn), a nickel-manganese (NiMn), and a chromium-manganese (CrMn) film. These films have high corrosion resistance since a platinum type metal such as Pd or Pt is used. These films also have a large exchange coupling magnetic field and a high blocking temperature since an ordered alloy is used. In the present invention, the antiferromagnetic layer 5 is typically made of PdPtMn. The blocking temperature of PdPtMn is 320° C.

The cap layer 6 is made of, for example, a Ta film having a thickness of 60 Å.

The spin vale element 10 is composed of the above-mentioned respective layers. The element 10 is suitable for mass production since the structure of the layers is relatively simple.

The pair of hard magnetism layers 11 adjacent to this spin valve element 10 are made of, for example, a CoCrPt film having a large coercive force $H_c$. The pair of electrode terminals 12 are made of a conductive material, and are composed of, for example, a three-layer structure having a titanium (Ti) film (thickness: 100 Å), a gold (Au) film (thickness: 800 Å) thereon, and a Ti film (thickness: 200 Å) thereon.

Referring to FIG. 3, the operation principle of the reproducing head 30_1 in the magnetic head 30 will be briefly described. The central function of the reproducing head 30_1 is attached by the following: the spin valve element 10 exhibits great change in its resistance by a weak magnetic field, as described below.

The antiferromagnetic layer 5 gives exchange interaction to the fixed magnetic layer 4 adjacent to the antiferromagnetic layer 5, as described above. By this exchange interaction, magnetization $M_p$ of the fixed magnetic layer 4 is fixed to the x direction. On the other hand, the easy axis of magnetization of the free magnetic layer 2 is made to an axis along the y direction. Thus, magnetization $M_f$ of the free magnetic layer 2 is directed to the y direction when no external magnetic field is present. When a weak external signal magnetic field $H_{sig}$ directed to the x or −x direction is applied, the magnetization $M_f$ of the free magnetic layer 2 rotates dependently on the signal magnetic field $H_{sig}$.

The electrical resistance of the spin valve element 10 changes dependently on the angle θ between the magnetization $M_f$ of the free magnetic layer 2, rotated dependently on the signal magnetic field $H_{sig}$, and the fixed magnetization $M_p$ of the fixed magnetic layer 4. That is, in proportion to the cosine (cos θ) of the angle θ between the magnetization directions of the two layers, resistance R of the spin valve element changes as follows:

$$R = R_{min} + (R_w/2) \times (1 - \cos \theta)$$

wherein $R_{min}$ is the resistance when θ is 0°, that is, when the magnetization $M_p$ and the magnetization $M_f$ are directed to the same direction, and $R_w$ is the maximum width of the change in the resistance R, which changes dependently on an external magnetic field. The resistance R becomes maximum when θ is 180°, that is, when the directions of the magnetization $M_p$ and the magnetization $M_f$ of the two layers are reverse to each other. It is supposed that in the reproducing head 30_1, the above-mentioned angle θ in the case that the signal magnetic field $H_{sig}$ is 0 becomes an ideal angle (i.e., 90°).

When the reproducing head 30_1 is operated, the sense current $I_s$ is sent from the pair of electrode terminals 12 shown in FIG. 2 to the spin valve element 10. When the reproducing head 30_1 is made close to the magnetic disk 103 (not illustrated in FIG. 3) and moved relatively to the disk 103 in the state that the sense current $I_s$ is sent, the signal detecting area S illustrated in FIG. 3 receives the signal magnetic field $H_{sig}$ which is substantially directed to the x or −x direction from the magnetic disk 103. Dependently on the signal magnetic field $H_{sig}$, the magnetization $M_f$ rotates so that the resistance R of the spin valve element 10 changes, as described above. As a result, an output voltage represented by the product of the resistance R and the sense current $I_s$ is outputted.

In the case that the magnetization $M_p$ and magnetization $M_f$ cross at right angles in the state that the signal magnetic field $H_{sig}$ is zero so that the above-mentioned angle is 90°, the resistance and the output voltage of the spin valve element 10 linearly change dependently on the signal magnetic field $H_{sig}$ from the outside magnetic disk 103. The fact that the resistance and the output voltage of the spin valve element 10 exhibit such linear change can be understood from the following: considering angle θ' shifted from the angle 90° (i.e., θ'=θ−90°), the cos θ in the above-mentioned equation for calculating the resistance R is represented by cos (90°+θ')=sin θ', and the resistance R linearly changes dependently on the shifted angle θ' when this angle θ' is very small.

If the angle θ is shifted from 90° when the signal magnetic field $H_{sig}$ is zero, this output voltage of the reproducing head 30_1 does not respond linearly to the input of the external signal magnetic field $H_{sig}$. Thus, such troubles that the reproduction waveform of the output voltage is distorted arise. From researches up to now, it is estimated that in order that the reproducing head 30_1 endures actual use, the above-mentioned angle θ is preferably 80° or more.

[Magnetic Head Producing Method]

Figure 5:
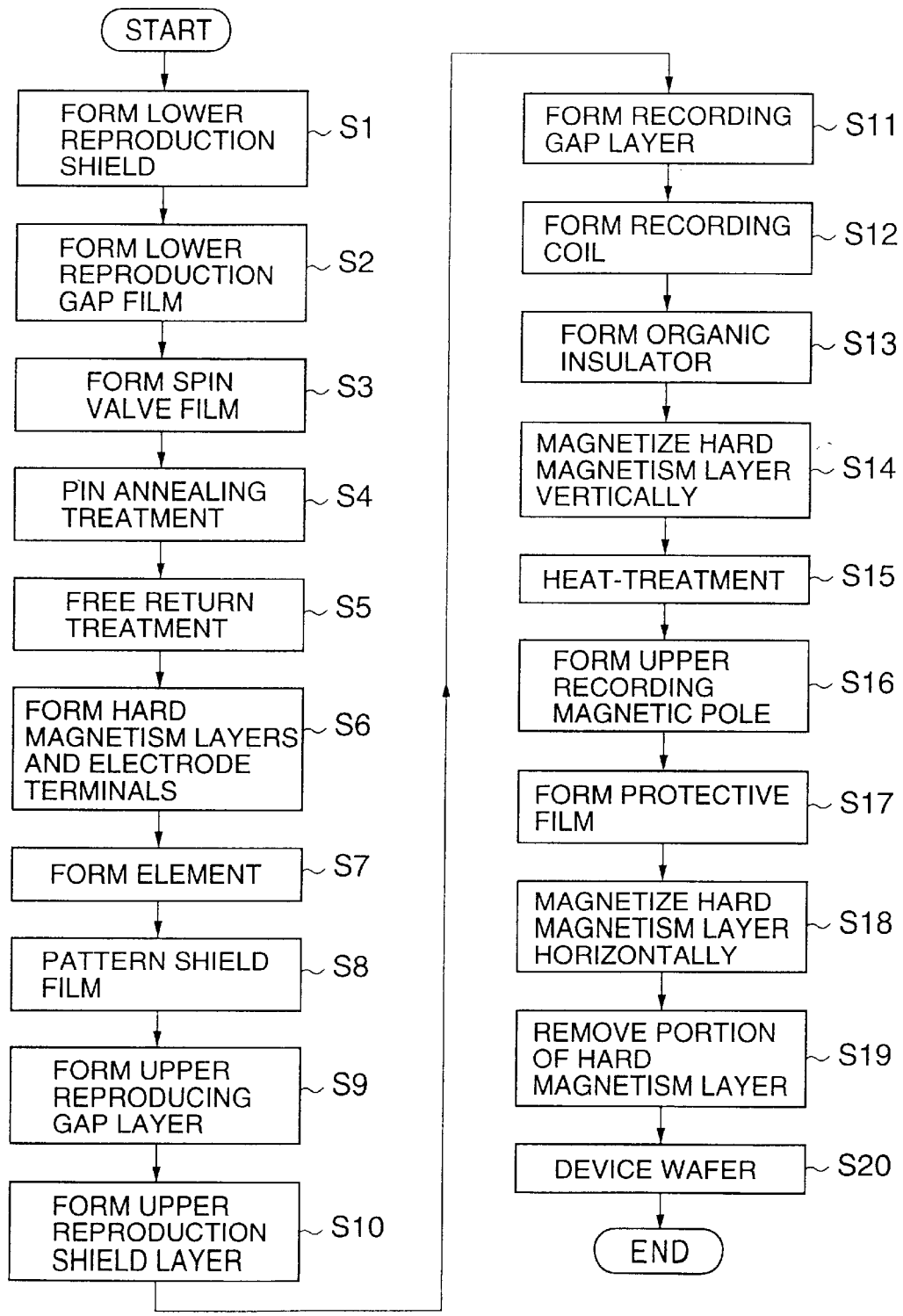
FIG. 5 is a flowchart showing the process for producing a magnetic head according to the magnetic head producing method of the embodiment.

The following will describe the magnetic head producing method according to the present embodiment for producing the magnetic head 30 illustrated in FIG. 2, referring to FIG. 5, which is a flowchart showing the process for the above-mentioned production of the magnetic head.

FIG. 5 is a flowchart showing the process for producing a magnetic head according to the magnetic head producing method of the above-mentioned embodiment.

As shown in this flowchart, this process advances in sequence from step S1 to step S20. For comparison, a magnetic head producing method in the prior art will also be described hereinafter. Unless otherwise described, this process in the prior art is advanced in the same manner as the process for producing the magnetic head according to the present embodiment.

First, in step S1, a lower reproduction shield film, which finally becomes the lower reproduction shield 21, is formed on a wafer. An example of the wafer is an alumina titanium carbide ($Al_2O_3$—TiC) on which a protective film of $Al_2O_3$ 4–5 inches in diameter is deposited. The lower reproduction shield 21 is made of, for example, a FeN film. About 10000 magnetic heads are collectively produced by the steps described in the following.

In step S2, a lower reproduction gap film, which finally becomes the lower reproduction gap layer, is formed on the lower reproduction shield film. This lower reproduction gap film is made of, for example, an insulating material such as $Al_2O_3$.

Instep S3, a spin valve film is formed on the whole surface of the wafer. This spin valve film will be subsequently trimmed to become the spin valve element 10. More specifically, respective films for the undercoat layer 1, the free magnetic layer 2, the nonmagnetic metal layer 3, the fixed metal layer 4, the antiferromagnetic layer 5, and the gap layer 6 are successively deposited on the lower reproduction gap film by sputtering, so as to make a multilayer structure.

In step S4, a pin annealing treatment is conducted. This treatment has the steps of applying a magnetic field, in the x direction, to the spin valve film formed in the step S3 while heating this film so that the magnetization direction of the fixed magnetic layer 4 in the spin valve film is fixed to the x direction along which the magnetic field is applied. Typical conditions of the pin annealing treatment are as follows: strength of the magnetic field is 200 kA/m, heating temperature is 280° C. and heating time is 3 hours. A reason why the magnetization direction of the fixed magnetic layer 4 is fixed by the pin annealing treatment is that the film made of an ordered alloy such as PdPtMn, which becomes the antiferromagnetic layer 5 later, in the spin valve film does not exhibit magnetism immediately after the deposition of the spin valve film, and only after this ordered alloy film is subjected to annealing treatment in a magnetic field, such as the pin annealing treatment, the ordered alloy film is made antiferromagnetic (ordered). By this generation of the antiferromagnetization, the magnetization $M_p$ of the fixed magnetic layer 4 is fixed to the x direction, which is the direction of the applied magnetic field. Such generation of order in the ordered alloy is caused by crystallization into face centered cubic structure (fcc) or face centered tetragonal structure (fct).

In step S5, a free return annealing treatment is conducted. The free return annealing treatment has the steps of applying a magnetic field, for example, in the y direction, to the spin valve film subjected to the pin annealing treatment in the step S4 while heating this film so that the easy axis of the magnetization of the free magnetic layer 4 in the spin valve film and the easy axis of the magnetization of the lower reproduction shield 21 are made to axes along the y direction, whereby magnetic anisotropy of these easy magnetization axes is reinforced. Typical conditions of the free return annealing treatment are as follows: strength of the magnetic field is 4 kA/m, heating temperature is 230° C. and heating time is 3 hours.

By these pin annealing treatment and free return annealing treatment, the direction of the magnetization $M_p$ of the fixed magnetic layer 4 can be made substantially perpendicular to the direction of the magnetization $M_f$ of the free magnetic layer 2. However, the free return annealing treatment has an influence on the magnetization $M_p$ of the fixed magnetic layer 4, so that the direction of the magnetization $M_p$ is inclined from the x direction to the side of the y direction or the −y direction. However, the degree of this inclination can be reduced by conducting the above-mentioned two treatments under appropriate conditions such as the above-mentioned typical treatment conditions.

Step S6 and step S7, which will be specifically described below, permit formation of the respective spin valve elements 10, the respective pairs of hard magnetism layers 11 and the respective pairs of electrode terminals 12 in the respective reproducing heads 30_1 of the plural magnetic heads 30 finally made on the wafer.

In step S6, areas other than the following areas of the wafer, on the whole surface of which the spin valve film is formed, are covered with a covering made by using a photoresist, $Al_2O_3$ and so on: the areas where the respective pairs of hard magnetism layers 11 and the respective pairs of electrode terminals 12 in the magnetic heads 30 are formed. Portions, of the spin valve film, where these hard magnetism layers 11 and the electrode terminals 12 are formed are taken off by ion milling. A hard magnetism film and a conductive film are successively deposited on the wafer from which these portions have been removed. The hard magnetism film is made of, for example, CoCrPt, and the conductive film is made of, for example, a three-layer structure having a titanium (Ti) film (thickness: 100 Å), a gold (Au) film (thickness: 800 Å) thereon, and a Ti film (thickness: 200 Å) thereon. After the deposition of these films, the covering with which the areas other than the electrode terminals 12 are covered is taken off. As a result, the above-mentioned pairs of hard magnetism layers 11 are formed on the lower reproduction gap film, and the above-mentioned pairs of electrode terminals 12 are formed on these pairs of hard magnetism layers 11.

In step S7, areas of the pairs of the electrode terminals 12 formed on the pairs of hard magnetism layers 11 in the step S6, and rectangle areas, each of which is sandwiched between the pair of electrode terminals 12 at intervals of, for example, about 1 μm in the y direction, in the spin valve film are covered with a photoresist. The spin valve film at portions other than these areas is removed from the wafer by ion milling or the like. By the removal, the spin valve film is trimmed into a rectangle shape so that the spin valve element 10 is formed.

One of characteristics of the magnetic head producing method according to the present embodiment is the shape of the hard magnetism layer 11 made in the step S6.

Figure 6:
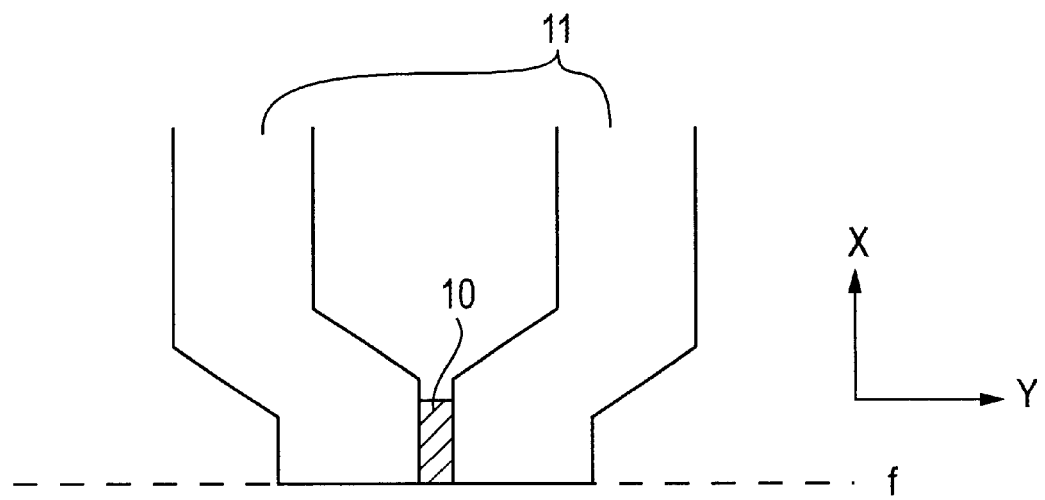
FIG. 6 is a view illustrating an example of the shape of a hard magnetism layer formed by a magnetic head producing method in the prior art.

FIG. 6 is a view illustrating an example of the shape of a hard magnetism layer formed by a magnetic head producing method in the prior art.

Specifically, FIG. 6 is schematic view showing the spin valve element 10 and the pair of hard magnetism layers 11', as seen along the z direction, of a magnetic head produced by a magnetic head producing method in the prior art. The element 10 and the layer 11' correspond to the spin valve element 10 and the pair of hard magnetism layers 11 made in the steps 6 and 7. The spin valve element 10 illustrated in FIG. 6 has the same structure as the spin valve element 10 of the above-mentioned magnetic head 30, and sandwiched between the pair of hard magnetism layers 11' in the y direction.

In general, any produced magnetic head is arranged in the manner that a given face (floating face f) of its spin valve element is close to a magnetic disk and opposite thereto in an HDD. In FIG. 6, the floating face f extending in the y and z directions is represented by a dot line. The pair of hard magnetism layers 11' are not present at the side of the floating face f of the spin valve element 10 in the same manner as the hard magnetism layer in the finally produced magnetic head.

Each of FIGS. 7(A), (B) and (C) is a view illustrating an example of the shape of a hard magnetism layer formed by the magnetic head producing method according to the present embodiment.

Specifically, each of FIGS. 7(A), (B) and (C) illustrates one of three examples of shapes of the hard magnetism layers 11 between which the spin valve element 10 is sandwiched. In the hard magnetism layer 11 illustrated in FIG. 7(A), the conventional hard magnetism layers 11' illustrated in FIG. 6 are connected to each other at the side of the floating face f, and the hard magnetism layer 11 is present at a portion over the floating face f, as seen from the spin valve element 10. The hard magnetism layer illustrated in FIG. 7(B) has the same shape as the conventional hard magnetism layer 11' illustrated in FIG. 6 at the side of the floating face f and at the both sides in the y directions, but has a gap between the face reverse to the floating face f and the hard magnetism layer 11. The gap extends in the y direction and subsequently the gap extends in the x direction. In the hard magnetism layer 11 illustrated in FIG. 7(C), the conventional hard magnetism layers 11' are connected to each other at the side of the floating face f, as seen from the spin valve element 10, in the same manner as in the hard magnetism layer 11 illustrated in FIG. 7(A). This hard magnetism layer 11 also has a gap at the face reverse to the floating face f as seen from the spin valve element 10 in the same manner as in the hard magnetism layer 11 illustrated in FIG. 7(B).

In step S8, unnecessary portion are removed out of the lower reproduction shield film by ion milling or the like to form the lower reproduction shield 21 patterned into the shape corresponding to the shape of the hard magnetism layer 11.

In step S9, an upper reproduction gap film made of, for example, $Al_2O_3$ is formed on the spin valve element 10.

In step S10, the upper reproduction shield 22 made of, for example, NiFe is formed on the upper reproduction gap.

Instep S11, a recording gap layer 23 made of, for example, $Al_2O_3$ is formed on the upper reproduction gap.

In steps S12 and S13, the recording coil 25 made of, for example, Cu is formed on the recording gap layer 23 while the neighborhood thereof is surrounded with an organic insulator, e.g., resist and the like.

Instep S14, the magnetization of the hard magnetism layer 11 formed in the step S6 is vertically magnetized (i.e., is directed to the x direction, which is perpendicular to the floating face f, and is then fixed) by applying a magnetic field of, for example, 240 kA/m.

In the step S15, the organic insulator surrounding the recording coil 25 formed in the steps S12 and S13 is heat-treated. By this heating-treatment, the temperature of the spin valve element 10 also rises up. This step S15 corresponds to a temperature rising step referred to in the present invention. This heating-treatment is conducted, for example, under the following heating conditions: heating temperature is 275° C. and heating time is 3 hours. The heating treatment is conducted in the state that the direction of the magnetization $M_p$ of the fixed magnetic layer 4 is fixed to the x direction since the hard magnetism layer 11 is vertically magnetized in the step S14. In order to explain effects by the heating treatment in this state, heating treatment in the prior art will be first described.

FIG. 8 is a view illustrating a first example of the state of the magnetization of the hard magnetism layer, before being subjected to the heating treatment, formed by a magnetic head producing method in the prior art.

Specifically, FIG. 8 illustrates the state that the hard magnetism layer 11' formed by the magnetic head producing method in the prior art and illustrated in FIG. 6 is horizontally magnetized (i.e., is magnetized in the y or –y direction, which is along the easy axis of the magnetization of the free magnetic layer 6) in the heating treatment of the organic insulator. In this case, magnetic charges are generated at two interfaces between the spin valve element 10 and the pair of hard magnetism layers 11' between which the spin valve element 10 is sandwiched in the y direction. By the magnetic charges, a magnetic field is generated in the y or –y direction in the spin valve element 10. Therefore, if the above-mentioned heating treatment is conducted in the state that this magnetic field is generated, the magnetization $M_p$ of the fixed magnetic layer 4 is inclined to the y or –y direction.

FIG. 9 is a view illustrating a second example of the state of the magnetization of the hard magnetism layer, before being subjected to heating treatment, formed by the magnetic head producing method in the prior art.

Specifically, FIG. 9 illustrates the state that the hard magnetism layer 11' formed as illustrated in FIG. 6 is magnetized in the x direction, along which the magnetization of the fixed magnetic layer 4 is fixed, in the heating treatment of the organic insulator. The method of conducting the above-mentioned heating-treatment in the state that the hard magnetism layer 11' is magnetized in the x direction is described in JP-A-11-175923. This case is different from the case that the hard magnetism layer 11' is magnetized in the y or –y direction. That is, in this case, no magnetic charges are generated at two interfaces between the spin valve element 10 and the pair of hard magnetism layers 11', between which the spin valve element 10 is sandwiched in the y direction as illustrated in FIG. 8. However, the size in the x direction of the spin valve element 10, which is represented by element-height, is as small as about 5 μm, so that even in no magnetic field the magnetization $M_p$ of the fixed magnetic layer 4 receives the antimagnetic field of the layer 4 itself to be inclined in the y or -y direction.

As described above, in the magnetic head producing method in the prior art, the magnetization $M_p$ of the fixed magnetic layer 4 is inclined to the y or -y direction in the above-mentioned heating treatment. Therefore, the reproduction waveform of the finally produced magnetic head does not respond linearly to the external signal magnetic field $H_{sig}$, so that troubles such as distortions arise.

On the other hand, in the magnetic head producing method of the present embodiment, the inclination of the magnetization $M_p$ of the fixed magnetic layer 4 to the y or -y direction is suppressed as illustrated in FIG. 10.

Figure 10A:
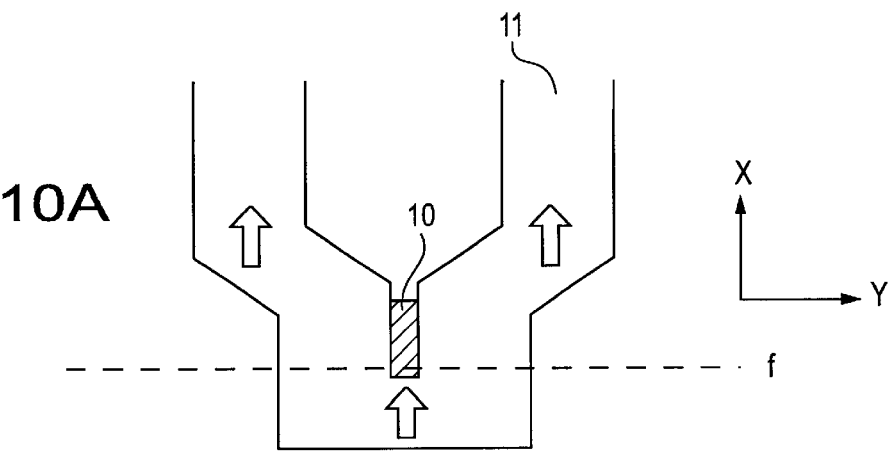
Figure 10B:
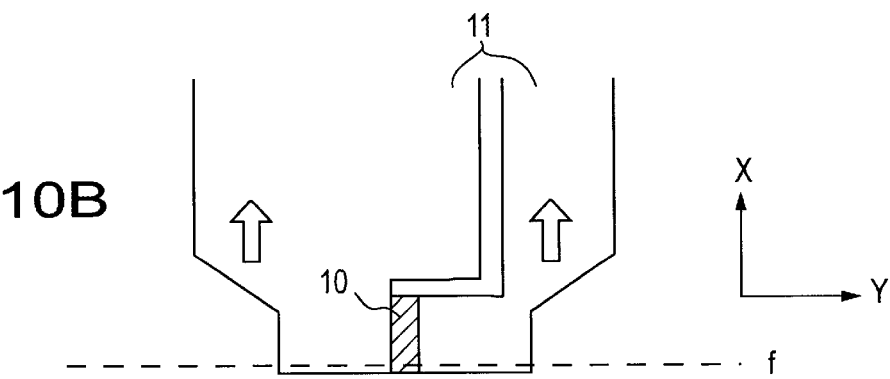
Figure 10C:
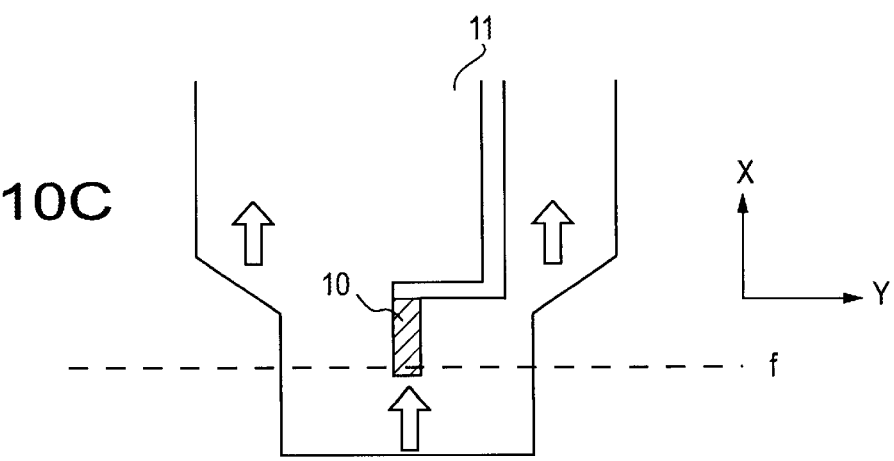

Each of FIGS. 10(A), 10(B) and 10(C) is a view illustrating an example of the state of the magnetization of the hard magnetism layer, before being subjected to heating treatment, formed by the magnetic head producing method according to the present embodiment.

Figure 7B:
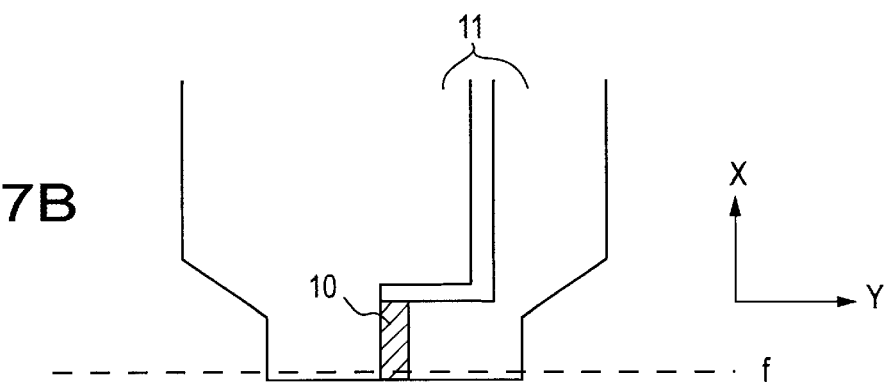
Figure 7C:
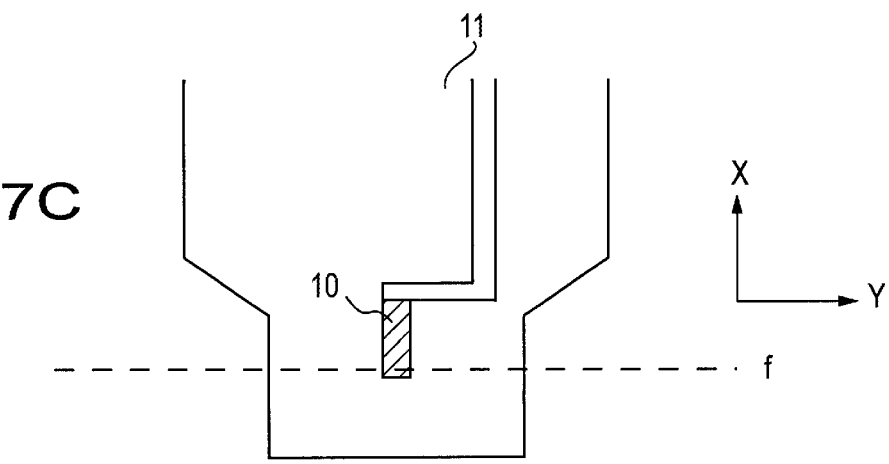

Specifically, each of FIGS. 10(A), 10(B) and 10(C) illustrates the state that the hard magnetism layer 11 formed as illustrated in each of FIGS. 7(A), 7(B) and 7(C) is magnetized in the x direction, along which the magnetization of the fixed magnetic layer 4 is fixed, in the heat treatment of the organic insulator. In this case, no magnetic charges are generated at two interfaces between the spin valve element 10 and the pair of hard magnetism layers 11' between which the spin valve element 10 is sandwiched in the y direction. However, in any one of the hard magnetism layers 11 illustrated in FIGS. 7(A)–(C), a part of the hard magnetism layer 11 is arranged in an area containing at least one of a space in the x direction area and a space in -x direction as seen from the spin valve element 10. Therefore, magnetic charges are generated in this area so that a magnetic field is applied in the x direction to the spin valve element 10. In the magnetic head producing method according to the present embodiment, the organic insulator is heat-treated in the state that the magnetic field in the x direction is applied to the spin valve element 10. Accordingly, effects are hardly produced on the directions of easy axes of the magnetization of the soft magnetism layers such as the lower reproduction shield 21 and the upper reproduction shield 22, and the effect of the above-mentioned antimagnetic field of the fixed magnetic layer 4 is also suppressed. In this state, the magnetization $M_p$ of the fixed magnetic layer 4 can be fixed to the x direction. The easy axis of the magnetization of the fee magnetic layer 2 will be directed to the y direction by horizontal magnetizing in step S19 described later.

By fixing the magnetization $M_p$ of the fixed magnetic layer 4 in the x direction in the above-mentioned manner, the angle θ between the direction of the magnetization $M_p$ of the layer 4 and the easy axes of the magnetization of soft magnetism layers such as the free magnetic layer 2 can be caused to approach 90°. Therefore, the reproduction waveform of the magnetic head produced by the magnetic head producing method according to the present embodiment substantially responds linearly to the external signal magnetic field $H_{sig}$ so as to have only small distortions.

In step S16, the upper recording magnetic pole 26 is formed on the recording coil 25. This upper recording magnetic pole 26 is made of, for example, NiFe.

In step S17, a protective film is formed on the upper recording magnetic pole 26. This protective film is made of, for example, $Al_2O_3$.

In step 18, the direction of the magnetization of the hard magnetism layer 11, which is fixed to the x direction in the step S14, is converted to the y direction (i.e., is horizontally magnetized) by applying an external magnetic field of, for example, 240 kA/m in the y direction thereto at ambient temperature. By the horizontal magnetizing after the heat treatment in the step S15, the easy axis of the magnetization of the free magnetic layer 2 is directed to the y direction.

In steps S19 and 20, the wafer on which the protective film is formed in the step S17 is divided into plural areas so that each of the areas includes one of the magnetic head 30. At the time of the division, a portion over the floating face f, as seen from the spin valve element 10, of the hard magnetism layer 11 is removed. In the steps S19 and S20, the process of the magnetic head producing method according to the present embodiment is finished.

The method of magnetizing the hard magnetism layer vertically before the heat treatment for raising the temperature of the spin valve element and magnetizing the hard magnetism layer horizontally after the heat treatment, as performed in the present embodiment, is effective for not only the heat treatment of the organic insulator, which accompanies the formation of the recording coil, but also other heat treatments which may cause the direction of the magnetization of the fixed magnetic layer to be off from the x direction. For this reason, this method can be adopted in the case that a magnetic head is composed of only a reproducing head. For example, in the case that leading conductors from electrode terminals of a reproducing head are formed, the lower reproduction shield 21 generally has a thickness of 1.5 μm. Therefore, a corner of the lower reproduction shield 21 may be exposed even if a thin insulating film is deposited on the lower reproduction shield 21. Thus, in order to prevent the contact of the lower reproduction shield with the leading conductors, a resist may be formed beneath the leading conductors and may be heated and hardened. The above-mentioned method is also effective for the heating of this resist.

Hitherto, there has been known a method of applying an external magnetic field in the x direction to the fixed magnetic layer 4 upon the heat treatment to direct the magnetization thereof to the x direction. According to this method of applying the external magnetic field, not only the magnetization of the fixed magnetic layer 4 but also the easy axes of the magnetization of the lower reproduction shield 21 and the upper reproduction shield 22, which are required to be along the y direction, are made to axes along the x direction. It is difficult that the easy axes of the magnetization of these shields are made to axes along the y direction by the above-mentioned horizontal magnetizing. On the other hand, in the magnetic head producing method accordingly to the present embodiment, the magnetic field for directing the direction of the magnetization of the fixed magnetic layer to the x direction in the above-mentioned heat treatment is a magnetic field applied by the hard magnetism layer 11. Therefore, this method is a preferred method wherein effects are hardly produced on the easy axes of the magnetization of the lower reproduction shield 21 and the upper reproduction shield 22.

As described above, according to the present invention, provided is a magnetic head producing method for producing a magnetic head whose reproduction waveform has small distortions.

What is claimed is:

1. A magnetic head producing method for producing a magnetic head comprising a magnetoresistive element which is a multilayer film comprising a fixed magnetic layer having magnetization fixed to a first direction and a free magnetic layer having an easy axis of magnetization that is directed to a second direction and having magnetization whose direction changes dependently on an external magnetic field, and the magnetoresistive element exhibiting a value of resistance that is dependent on the angle between the direction of the magnetization of the fixed magnetic layer and the direction of the magnetization of the free magnetic layer, the magnetic head detects an intensity of the external magnetic field by detecting the value of the resistance of a magnetoresistive element, comprising a hard magnetism layer forming step of forming a hard magnetism layer for applying a bias magnetic field to the magnetoresistive element in an area including at least one of a front area in the first direction and a rear area in the first direction viewed from the magnetoresistive element.

2. The magnetic head producing method according to claim 1, which further comprises a first magnetization fixing step of fixing a direction of magnetization of the hard magnetism layer to the first direction.

3. The magnetic head producing method according to claim 2, which further comprises:

a temperature raising step of raising the temperature of the magnetoresistive element, a second magnetization fixing step of converting and fixing a direction of magnetization of the hard magnetism layer fixed in the first magnetization fixing step to the second direction, and wherein after the hard magnetism layer forming step and the first magnetization fixing step, the temperature raising step is performed, and thereafter the second magnetization fixing step is performed.

4. The magnetic head producing method according to claim 3, which further comprises, in the case of the magnetic head having a recording coil and a function of generating a magnetic field from the recording coil as well as detecting the intensity of the external magnetic field, a coil forming step of forming the recording coil while surrounding the recording coil with an organic insulator, wherein the temperature raising step is a step of heating and hardening the organic insulator with which the recording coil formed in the coil forming is surrounded.

5. The magnetic head producing method according to claim 3, wherein the magnetoresistive element is arranged so that the magnetoresistive element is close to or brought into contact with a magnetic recording medium, on which information is recorded dependently on the direction of magnetization at the time of operation, at either side of the front or the rear in the first direction;

further wherein the hard magnetism layer formed in the hard magnetism layer forming step has a portion positioned at a side facing the magnetic recording medium viewed from the magnetoresistive element; and the portion is removed after the second magnetization fixing step.

* * * * *